(12) United States Patent
Cho et al.

(10) Patent No.: US 9,880,289 B2
(45) Date of Patent: *Jan. 30, 2018

(54) METHOD OF MEASURING RADIOACTIVE MATERIAL OF INGOT USING NAI GAMMA SCINTILLATOR

(71) Applicant: KEPCO NUCLEAR FUEL CO., LTD., Daejeon (KR)

(72) Inventors: Suk Ju Cho, Daejeon (KR); Young Bae Lee, Daejeon (KR); Jeung Gun Seol, Daejeon (KR); Yong Jae Kim, Daejeon (KR); Jae Bong Ryu, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 1440 days.

This patent is subject to a terminal disclaimer.

(21) Appl. No.: 13/873,328

(22) Filed: Apr. 30, 2013

(65) Prior Publication Data

US 2013/0297228 A1    Nov. 7, 2013

(30) Foreign Application Priority Data

May 3, 2012  (KR) .......................... 10-2012-0046977

(51) Int. Cl.
*G01N 31/00* (2006.01)
*G01T 1/167* (2006.01)

(52) U.S. Cl.
CPC .................................... *G01T 1/167* (2013.01)

(58) Field of Classification Search
CPC .................................................... G01T 1/167

USPC ............................................................ 702/30
See application file for complete search history.

(56) References Cited

U.S. PATENT DOCUMENTS 4,857,729 A * 8/1989 Gadeken ............. E21B 47/1015
250/256

FOREIGN PATENT DOCUMENTS

| JP | 05-340861 A | 12/1993 |
|---|---|---|
| KR | 10-1016223 B1 | 2/2011 |
| KR | 10-2011-0091264 A | 8/2011 |

OTHER PUBLICATIONS

El-Gammal, "Verification of 235U mass content in nuclear fuel plates by an absolute method", Nuclear Instruments and Methods in Physics Research (2007).*
Schlienger et al., "Melt Processing of Radioactive Waste: A Technical Overview" (1997).*

(Continued)

*Primary Examiner* — Stephanie Bloss
(74) *Attorney, Agent, or Firm* — Rabin & Berdo, P.C.

(57) ABSTRACT

Disclosed is a method of measuring radioactive material of an ingot, in which an ingot having a volume produced by subjecting metal waste generated in nuclear fuel processing or production facilities to melting decontamination undergoes gamma spectroscopy using a NaI detector to measure gamma rays of U-235 (185.72 keV, 57.2%) among uranium isotopes, followed by performing detector calibration using a certified reference material and self-absorption correction depending on the density of a medium using MCNP computer code, and which enables rapid determination of whether the ingot subjected to melting decontamination may be self-disposed of or not.

5 Claims, 6 Drawing Sheets

(56) References Cited

OTHER PUBLICATIONS

Anilkumar et al., "Estimation of 235U concentration in some depleted uranium samples by high resolution gamma-ray spectrometry using 185keV and 1001keV gamma-energies of 235U and 234mPa" (2006).*

Rich et al. ("Health Physics Manual of Good Practices for Uranium Facilities", (1988).*

Ki Hoon Yoon et al., "Analysis of uranium isotopes contained in the analyzed sample using HPGe ϒ-Spectrometry", 2009 Spring Research Meeting Collected Papers, Korean Association for Radiation Protection, pp. 128-129.

* cited by examiner (a) CERTIFIED REFERENCE MATERIAL SPECTRUM (b) ENERGY CALIBRATION (LEFT)/EFFICIENCY CALIBRATION (RIGHT)

METHOD OF MEASURING RADIOACTIVE MATERIAL OF INGOT USING NAI GAMMA SCINTILLATOR

BACKGROUND OF THE INVENTION

1. Field of the Invention

The present invention relates to a method of measuring the radioactive material of an ingot using a NaI gamma scintillator, and more particularly, to a method of measuring the radioactive material of an ingot, in which an ingot having a volume produced by subjecting metal waste generated in nuclear fuel processing or production facilities to melting decontamination undergoes gamma spectroscopy using a NaI gamma scintillator, thus rapidly and efficiently measuring radioactivity of the radioactive material of the ingot.

2. Description of the Related Art

Industrial waste composed mainly of iron metals such as stainless steel and carbon steel is treated as a very important resource, and the rate of recycling thereof is considerably higher than other waste.

Typically, recycling of waste aims to resolve the shortage of natural resources and problems caused by air, water and soil contamination due to waste. However, in the case of metal, because the cost required to recycle resources or waste which has been re-treated is much smaller than the production cost of products using new natural resources, disposal of generated metal waste without recycling is regarded as a big loss in terms of environmental protection and economic benefits.

Also metal waste generated in nuclear facilities may be reproduced using a recycling process like other industrial metal waste. However, there is a potential for such metal waste to be radioactive because of artificial neutron irradiation or for the surface or volume thereof to have been contaminated by the radioactive materials used in nuclear facilities. Hence, when this waste is discharged to the market without appropriate restrictions, the public may be indiscriminately exposed depending on the recycling of contaminated metals. Accordingly, all metal waste generated in the radiation controlled zones of nuclear facilities is considered to be subject to restrictions in principle. However, if the same restriction rule is applied to the case where radiological effects on the public and the environment are considerably small because the concentration of radionuclides in metal waste is very small, the economic and social costs may be unnecessarily increased. In accordance with domestic nuclear-relevant act, only in the case where the concentration of radionuclides of metal waste is below a predetermined level (a clearance limit), namely where radiological effects on the public and the environment due to the recycling of metal waste are not more than a clearance limit defined by the nuclear-relevant act, is the waste deregulated so as to be disposed of (recycled). The related radiation safety management and radiological risk assessment are an absolute requirement of regulatory agencies, thus minimizing radiological effects on the public and the environment resulting from clearance.

Because metal waste such as filter frames, powder drums for natural uranium, nuts, bolts and metal scrap generated in nuclear fuel processing and production facilities are expected to be contaminated with uranium compounds such as $UO_2$, $UO_2F_2$ or $U_3O_8$, these are regarded as radioactive waste and have to be regulated. However, the case where the concentration of the radioactive contaminant in the waste is not more than a clearance limit as mentioned above is deregulated, making it possible to carry out clearance via recycling.

Meanwhile, metal waste which is of the flat panel type and has a geometrical shape that is comparatively simple and which has a smooth surface or which has shapes similar thereto may be recycled using only surface decontamination. The real-time determination of radioactivity after a decontamination process is possible using both direct measurement using a surface contamination meter that is used in nuclear fuel processing plants and indirect measurement using smear. Thus, the surface contamination of metal waste having complicated geometrical shapes such as nuts or bolts cannot be subjected to direct measurement and smear measurement is also not easy, making it very difficult to decontaminate such metal waste and measure the radioactivity thereof.

In the case where metal waste having a complicated structure is heated to high temperature and melted, because the radioactive material in metal is uniformly distributed in the medium and the nuclear fuel material which is a contaminant of the melt moves into the slag, metal waste on which it is difficult to perform surface decontamination and direct measurement may be subjected to melting decontamination so that the volume thereof is reduced and uranium materials are removed from the metal medium, making it possible to carry out clearance.

Thorough research into melting decontamination techniques of metal waste containing radioactive materials is ongoing both within and outside the country. Particularly in the case where contaminants are nuclear fuel (uranium nuclides), most radioactive contaminants are reported to move into the slag upon melting. Although the decontamination effects thereof may vary depending on initial contamination conditions and operating conditions including the melting additive used, the type of melting furnace, etc., the amount of uranium moving into the slag upon melting decontamination of the metal is at least 1000 times the amount of uranium that moves to ingots. This trend is reported to increase as the initial contamination becomes higher.

For example, Korean Patent No. 10-1016223 discloses a melting decontamination system of radioactive metal scrap, in which radioactive metal waste generated in nuclear facilities, containing U-238, Ce-144, Cs-134, Cs-137, Sr-89, Sr-90, Ni-63, Co-58, Co-60, Cr-51, etc. as nuclides to be decontaminated, are subjected to melting decontamination, so that decontaminated ingots are separated from radioactive slag, and the decontaminated ingots are recycled and the radioactive slag is treated as radioactive waste.

However to perform clearance of the ingots produced using melting decontamination, radioactivity of the ingots should be proven to be less than the disposal limit defined by nuclear-relevant act. To this end, measurement of the radioactivity of the ingots must be reliable.

Prior to melting decontamination, metals have surface contamination characteristics, whereas ingots produced using melting decontamination have volume contamination characteristics. Uranium nuclides which are radioactive contaminants are alpha emitters, so that alpha rays emitted upon the decay of uranium react with the medium and are mostly self-absorbed. Thus conventional radioactivity analysis methods using alpha nuclide surface contamination measurement may not be effective at analyzing the radioactivity of ingots.

Therefore the present invention is intended to provide a method of rapidly and efficiently measuring the radioactive material of an ingot having a volume resulting from melting decontamination of metal waste generated in nuclear fuel processing or production facilities, in order to enable clearance of the ingot.

SUMMARY OF THE INVENTION

Accordingly, the present invention has been made keeping in mind the above problems encountered in the related art, and an object of the present invention is to provide a method of rapidly and efficiently measuring the radioactive material of an ingot having a volume using a NaI detector in order to achieve clearance of the ingot, in which such an ingot may be produced by subjecting metal waste generated in nuclear fuel processing or production facilities to melting decontamination.

In order to accomplish the above object, the present invention provides a method of measuring a radioactive material of an ingot, in which an ingot having a volume produced by subjecting metal waste generated in nuclear fuel processing or production facilities to melting decontamination undergoes gamma spectroscopy using a NaI detector to measure gamma rays of U-235 (185.72 keV, 57.2%) among uranium isotopes, followed by performing detector calibration using a certified reference material (CRM) and self-absorption correction depending on a density of a medium using MCNP (Monte Carlo N-Particle) computer code, thus measuring the radioactive material of the ingot.

Preferably in the present invention, U-235 has an enrichment of 0.711 w/o~5 w/o, and more preferably the enrichment of U-235 is determined depending on a source of the generated metal waste. Preferably, the radioactivity and mass of U-235 are quantified using a detection value of U-235, and radioactivity of total uranium is obtained from the following equation depending on the enrichment of U-235.

$$S.A(Ci/g)=(0.4+0.38E_{235}+0.0034E_{235}^2)\times 10^{-6}$$ [Equation]

In the above equation, S.A is a specific activity of total uranium using the enrichment ($E_{235}$) of U-235.

Preferably in the present invention, an effective live time of the ingot using the NaI detector is 3,600~7,200 sec.

Preferably in the present invention, the ingot has a thickness of 1~5 cm.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
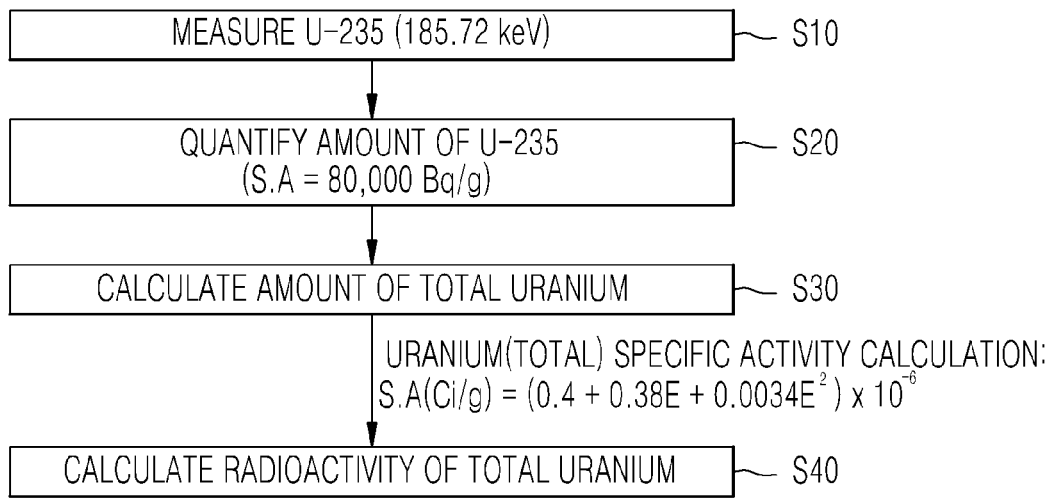
FIG. 1 is a flowchart schematically illustrating a procedure of determining the radioactivity of total uranium, in a process of measuring the radioactive material of an ingot using a NaI gamma scintillator according to the present invention.

Hereinafter, embodiments of the present invention will be described in detail with reference to the appended drawings.

Typically, the surface of metal waste generated in nuclear fuel processing or production facilities may be contaminated by a very small amount of nuclear fuel material due to dust or the like generated during processing of nuclear fuel. Thus, the nuclear fuel material generated in nuclear fuel processing or production facilities is provided in the chemical form of $UO_2$, $U_3O_8$, etc., having an enrichment from 0.711 w/o (natural uranium) to 5 w/o, and exists in a particulate phase.

Radiation sources included in uranium ores used upon production of nuclear fuel may include not only uranium isotopes for example, U-238, U-235, U-234 and the like, but also daughter nuclides, fission products, transuranic radionuclides, etc. resulting from decay of the uranium isotopes. However, radionuclides other than the uranium isotopes are removed via a series of uranium refining, transformation and re-transformation to manufacture nuclear fuel. Also, the daughter nuclides of uranium resulting from radioactive decay to create a nuclear fuel assembly are estimated to exist in a very small amount which is difficult to analyze, taking into consideration the nuclear fuel processing time and the like, and furthermore the metal waste is refined again via melting decontamination and thus the contaminants of the ingots produced from the metal waste may also be limited to uranium isotopes, such as U-234, U-235 and U-238, and daughter nuclides such as Th-234 and the like which achieve radioactive equilibrium within a short time.

Also, unlike nuclear power plants, in nuclear fuel processing facilities, the probability of radioactive metals being formed due to neutron irradiation is very low, and thus there is no potential for radioactive metal waste to be created.

Meanwhile, all of uranium isotopes U-234, U-235 and U-238 emit gamma rays via alpha decay. U-235 emits gamma rays of 185.72 keV at high rate (57.2%) and thus gamma rays may be directly measured and the radioactivity may be calculated, whereas it is not easy to directly determine U-234 and U-238. For example, directly determining U-234 and U-238 may be carried out using secular equilibrium with uranium's daughter nuclides in nature, but is problematic because a considerably long period of time is required to achieve secular equilibrium. Particularly metal waste generated in nuclear fuel processing or production facilities includes enriched uranium which is present in a state in which uranium and its daughter nuclides have unbalanced concentrations, making it impossible to calculate radioactivity of U-234 or U-238 via measurement of gamma rays of daughter nuclides.

Accordingly in the present invention, an ingot having a volume resulting from melting decontamination of metal waste generated in nuclear fuel processing or production facilities undergoes gamma spectroscopy using a NaI gamma scintillator as a detector to measure gamma rays of U-235 (185.7 keV, 57.2%) among uranium isotopes, followed by performing detector calibration (energy and efficiency calibration) using a certified reference material (CRM) and self-absorption correction depending on the density of a medium using MCNP computer code, thus obtaining a uranium concentration from which the radioactive material of the ingot is then measured.

In the present invention, the ingot is produced from metal waste using melting decontamination, sampling in a melt and molding, and has a thickness of about 1 cm or more which is not effective at typically measuring radioactivity using alpha spectroscopy.

Particularly in the present invention, the radioactivity of total uranium is determined by using U-235 (185.72 keV, 57.2%) as a direct measurement value, and by an equation in which the specific activity of total uranium may be determined using the enrichment of U-235 depending on the source of the generated metal waste based on analytic results of measured U-235.

In the method of measuring the radioactive material according to the present invention, the measurement time of the ingot may fall in the range of 3,600~7,200 sec using a NaI gamma scintillator, thus rapidly and efficiently determining whether clearance of the ingot subjected to melting decontamination is possible.

U-235 emits gamma rays of 185.7 keV at a high rate of 57.2% upon decay, making it possible to directly measure U-235. As such, gamma rays emitted from U-235 measured in this range are interfered with by gamma rays of 186.2 keV (3.59%) emitted from Ra-226 in nature.

$$C(186) = C(^{235}U, 185.7) + C(^{226}Ra, 186.21)$$

Specifically, in order to calculate the radioactivity of U-235 based on the count rate measured in the energy range of 185~186 keV, the count rate measured by decay of Ra-226 in the same energy range should be corrected. Because Ra-226 which exists in nature is in a state of secular equilibrium with its daughter nuclides Pb-214 and Bi-214, the gamma rays of Pb-214 and Bi-214 are measured to calculate the count rate of gamma rays emitted by decay of Ra-226. In the case where a daughter nuclide of Ra-226, that is, Rn-222 which is present in a gas phase, is allowed to stand open to the air, it may diffuse in air. Hence, Rn-222 must be stored sealed for a period of time (about one month) sufficiently longer than its half life of 3.82 days so as to prevent it from being emitted into the air.

The relationship between the count rate of gamma rays of 295.2 keV emitted from Pb-214 and the count rate of gamma rays of 186.21 keV emitted from Ra-226 is represented by the following Equation 1.

$$C(^{226}Ra, 186.21) = \frac{\varepsilon(186.21) \times I(^{226}Ra, 186.21)}{\varepsilon(295.2) \times I(^{214}Pb, 295.2)} \times C(^{214}Pb, 295.2) \quad \text{[Equation 1]}$$

Pb-214 also emits gamma rays of 351.9 keV, and cross validation may be conducted using the same. The count number of gamma rays emitted from Pb-214 may be interfered with by gamma rays of 351.06 keV emitted from Bi-214. Although the count number of gamma rays of 351.9 keV emitted from Pb-214 may be interfered with by gamma rays of 351.06 keV emitted from Bi-214, Bi-214 and Pb-214 are in secular equilibrium as mentioned above, thereby making it possible to determine the radioactivity of each nuclide.

$$C(^{226}Ra, 186.21) = \frac{\varepsilon(186.21) \times I(^{226}Ra, 186.21)}{\varepsilon(351.9) \times I(^{214}Pb, 351.9)} \times \frac{C(351)}{1 + \frac{\varepsilon(351.06) \times I(^{214}Bi, 351.06)}{\varepsilon(351.9) \times I(^{214}Pb, 351.9)}}$$

Typically because Ra-226 and U-238 have the same radioactivity in nature in which a mother nuclide and a daughter nuclide are in secular equilibrium, it is possible to calculate effects of gamma rays of 186.21 keV of Ra-226 with the radioactivity of U-238 in nature. In the case of a natural sample containing naturally enriched uranium, 57.6% of the area of the peak of the energy range of 185~187 keV is caused by Ra-226. Thus the case where the sample containing natural radioactive nuclides such as concrete is contaminated by a nuclear fuel material needs correction to calculate uranium radioactivity.

However, in the case of metal waste, because the medium itself does not contain nuclides present in nature, Ra-226 or the like creates no interference. When the sample is contaminated with artificially enriched nuclear fuel, the count number of gamma rays of U-235 may be overestimated because of the gamma rays of Ra-226 formed by decay from U-238. However, millions of years are required until the amount of gamma rays emitted from Ra-226 produced from artificially contaminated U-238 has an influence on the quantification of U-235, and thus the effects of Ra-226 resulting from artificial uranium contamination in nuclear fuel plants may be ignored.

The nuclear fuel material handled in nuclear fuel processing or production facilities includes only uranium isotopes, in which the uranium enrichment falls in the range of 0.711 w/o (natural uranium)~5.0 w/o. Because the nuclear fuel used is processed differently depending on its enrichment in a manner similar to that used to process fuel for a heavy water reactor, which is manufactured separately from fuel for a light water reactor, it is possible to determine the enrichment of the nuclear fuel contaminant depending on the source of the generated metal waste and also to estimate the activity ratio and the abundance ratio of U-238 and U-234 by quantification of only U-235, as given in Table 1 below.

TABLE 1

Abundance Ratio and Activity Ratio of Uranium Isotopes depending on Enrichment of U-235

| Nuclide | Nature | | 2.0 w/o | | 3.5 w/o | | 4.5 w/o | |
|---|---|---|---|---|---|---|---|---|
| | Abundance Ratio | Activity Ratio | Abundance Ratio | Activity Ratio | Abundance Ratio | Activity Ratio | Abundance Ratio | Activity Ratio |
| U-234 | 0.00005 | 0.48700 | 0.00016 | 0.73500 | 0.00030 | 0.82300 | 0.00039 | 0.85625 |
| U-235 | 0.00711 | 0.02300 | 0.02000 | 0.03043 | 0.03500 | 0.03400 | 0.04500 | 0.03319 |
| U-238 | 0.99284 | 0.49000 | 0.97984 | 0.23400 | 0.96470 | 0.14400 | 0.95461 | 0.11055 |

Figure 2:
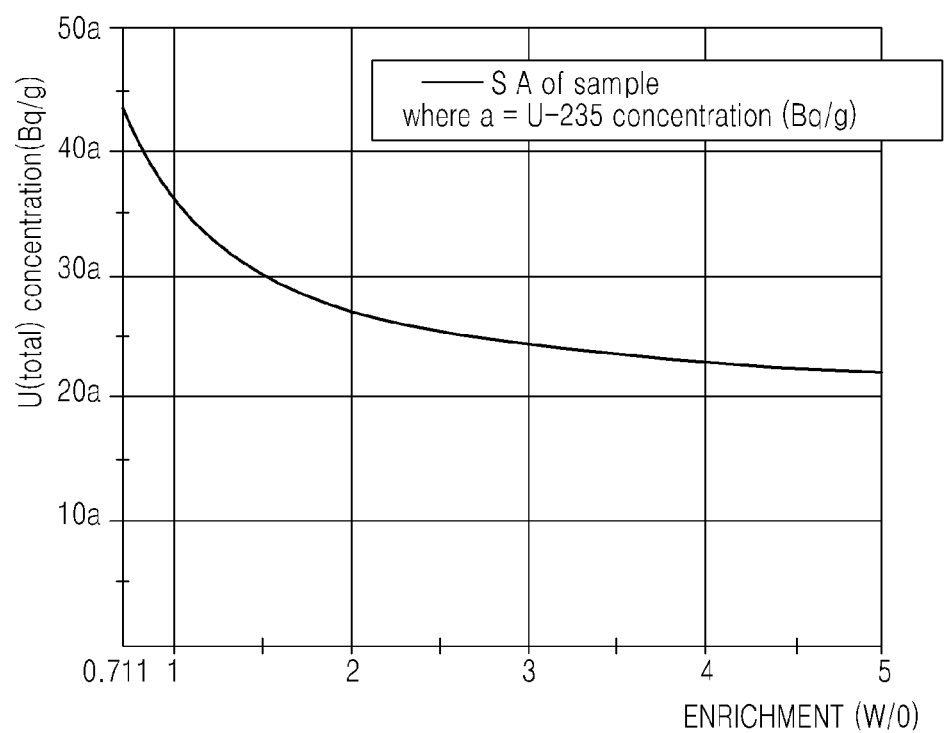
FIG. 2 is a graph illustrating the uranium radioactivity depending on the enrichment in the process of measuring the radioactive material according to the present invention.

FIG. 1 schematically shows the procedure of calculating the radioactivity of total uranium via detection of U-235 (185.72 keV, 57.2%) according to the method of the invention, in which the radioactivity and mass of U-235 are quantified from the detection value of U-235, and the total uranium weight may be calculated using the abundance ratio of Table 1 from the enrichment of U-235, and also the radioactivity of total uranium may be obtained from Equation 2 below (For reference, FIG. 2 is a graph illustrating the specific activity of uranium depending on the enrichment of U-235).

$$S.A(Ci/g) = (0.4 + 0.38 E_{235} + 0.0034 E_{235}^2) \times 10^{-6}$$ [Equation 2]

In Equation 2, S.A is the specific activity of total uranium using the enrichment ($E_{235}$) of U-235.

For example, when U-235 is measured to be 1 Bq, the specific activity of U-235 is $8.00 \times 10^4$ Bq/g, and the corresponding weight is $1.25 \times 10^{-5}$ g. When the enrichment is 2.0 w/o, the total uranium weight may be determined to be $6.254 \times 10^{-4}$ g as seen in Table 1, and thus the total radioactivity may be calculated to be 27.14 Bq from the specific activity of total uranium obtained using the enrichment (2 w/o) of U-235 in Equation 2.

Table 2 below shows the radioactivity of uranium depending on the enrichment of representative U-235.

TABLE 2

Uranium Radioactivity depending on Enrichment

| | Enrichment (w/o) | | | |
|---|---|---|---|---|
| | 0.711 | 2 | 3.5 | 5 |
| Radioactivity (Bq) of Measured U-235 | 1 | 1 | 1 | 1 |
| U-total estimated amount (g) | $1.763 \times 10^{-3}$ | $6.254 \times 10^{-4}$ | $3.574 \times 10^{-4}$ | $2.504 \times 10^{-4}$ |
| U-total radioactivity (Bq) | 43.70 | 27.14 | 23.41 | 22.06 |

When the radioactivity of U-235 is determined in this way, the estimated amount of U-238 increases in proportion to the decrease in the enrichment of uranium, thus increasing the total amount of uranium, resulting in higher total radioactivity.

The concentration of U-235 is quantified via gamma nuclide analysis, after which the enrichment which deduces the most conservative result is applied thus estimating the radioactivity of total uranium.

However, in the case metal waste generated in the course of manufacturing nuclear fuel for a light water reactor using 4.5 w/o uranium is handled like the metal waste generated during the manufacture of nuclear fuel for a heavy water reactor, the radioactivity obtained as above may be overestimated to the extent of about two times compared to the former. For accurate analysis, metal waste has to be sorted depending on the generation source and then separately analyzed. Metal waste having an unclear generation source may be subjected to radioactivity assay using natural uranium from which the most conservative result is deduced.

—Self-Absorption Correction—

In the present invention, the certified reference material ($H_2O$: $\rho = 1.0$ g/cm$^3$) and the sample (ingot (chipped): $\rho = 0.1 \sim 7.8$ g/cm$^3$) to undergo gamma nuclide analysis depending on the density of a medium are simulated using MCNP (Monte Carlo N-Particle) computer code, and probabilities of the gamma rays generated upon decay of U-235 in the medium reaching the detector are respectively calculated, thus attaining an absorption correction factor for the ingot samples.

EXAMPLE

A gamma spectrometer used in an example of the invention is identiFINDER available from Thermo provided with a multichannel analyzer, NaI (1.4 in×2 in), a GM tube, and a neutron monitor ($^3$He tube), making it possible to perform analysis of gamma nuclides and discrimination of the nuclides and to measure spatial dose. This detector is provided with 3 nCi Cs-137, so that energy calibration is possible without an additional calibration source, a maximum of 100 spectrums obtained using detection may be stored and the collected spectrums may be downloaded via connection with the PC to enable analysis on the PC.

Typically, minimum detection activity (MDA) of the detector is in inverse proportion to the effective live time and is proportional to the square root of the background count. To ensure sufficient MDA upon measurement, effects of background radiation should be minimized, and the detection time of a predetermined period of time or longer should be ensured.

A background count rate is maintained at a predetermined level so long as additional shielding is not carried out. Thus, as the detection time increases, MDA decreases in proportion to the square root of the detection time. Even when the detection time is increased under the condition of a predetermined level being exceeded, MDA is not greatly decreased, and thus it is important to minimize the effects of background radiation using shielding or the like.

Figure 3:
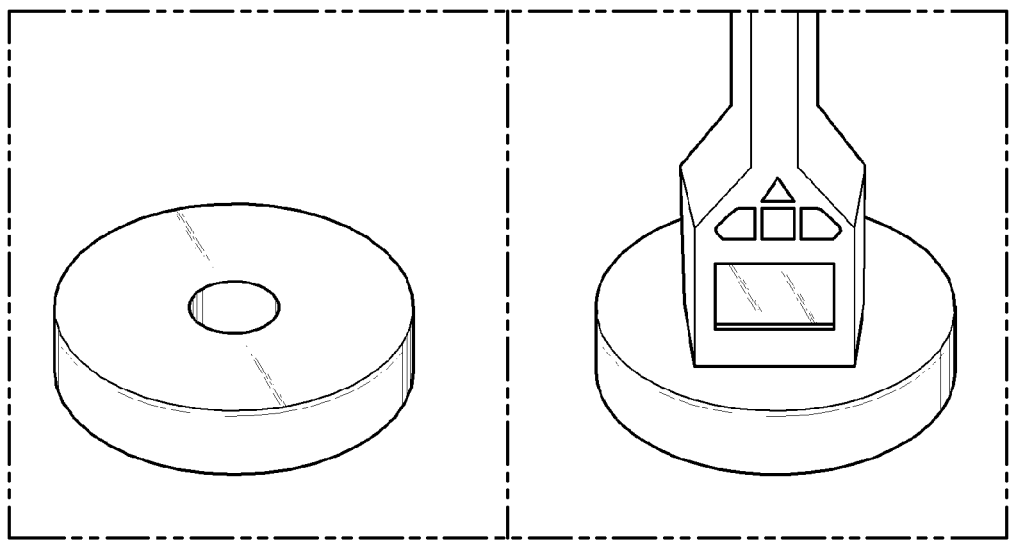
FIGS. 3 and 4 are photographs illustrating an internal shielding body, an external shielding body, and a detector used in the process of measuring the radioactive material according to the present invention.
Figure 4:
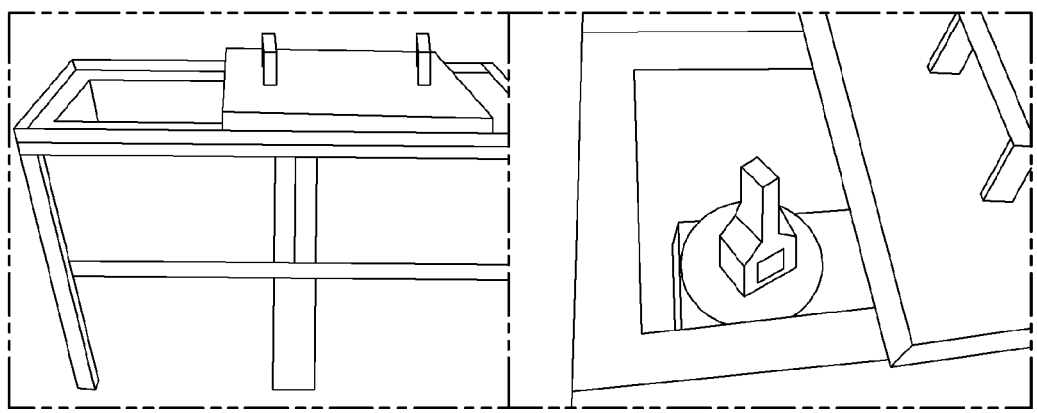

To maximally remove the background effects of background radiation in the present example, internal and external shielding bodies were manufactured in a double form as illustrated in FIGS. 3 and 4. The shielding bodies are made of lead, and the internal shielding body of FIG. 3 has a height of 6.5 cm, an inner diameter of 5.2 cm and an outer diameter of 20 cm, so as to cover the NaI probe of the detector.

The external shielding body (a shielding box) of FIG. 4 has a size of 420 mm×620 mm×410 mm, so that an ingot produced using melting decontamination is placed in the shielding body. To shield background radiation, 50 mm thick lead was provided on the top and wall of the shielding box, and a 25 mm thick stainless steel plate was applied to the bottom thereof in terms of self-shielding by the ingot and maintaining the shape of the shielding box. The shielding box weighed about 500 kg, of which the weight of the lead used for shielding was about 420 kg.

To calculate MDA depending on shielding effects and detection time, the detection value and MDA of the sample ingot were calculated depending on the measurement time.

waste generated in the heavy water reactor process in which the detection of emitted gamma rays of U-235 is difficult due to comparatively low enrichment, the measurement time corresponding to about 1.5~2 times that of the metal waste (about 4.5 w/o) generated in the light water reactor process to ensure the same MDA value is required. However, the method of analyzing radioactivity of the ingot using gamma nuclide (U-235) analysis is carried out from a very conservative point-of-view, and thus the measurement time has to be appropriately determined depending on the situation.

TABLE 3

Measurement Results of Sample Ingot using NaI Detector
(U concentration = 0.0187 Bq/g)

| | | | out of Shielding Box | | | in Shielding Box | |
|---|---|---|---|---|---|---|---|
| | Measure Time | Measure Value | MDA (Bq/g) | | Measure Value | MDA (Bq/g) | |
| No. | (s) | (Bq/g) | 4.65 w/o | 0.711 w/o | (Bq/g) | 4.65 w/o | 0.711 w/o | Note |
| 1 | 1,000 | <MDA | 1.695E−01 | 3.324E−01 | <MDA | 6.641E−02 | 1.303E−01 |
| 2 | 2,000 | | 1.166E−01 | 2.287E−01 | | 4.742E−02 | 9.299E−02 |
| 3 | 3,600 | | 8.993E−02 | 1.764E−01 | | 3.530E−02 | 6.922E−02 |
| 4 | 5,000 | | 7.397E−02 | 1.451E−01 | | 3.057E−02 | 5.950E−02 |
| 5 | 7,200 | | 6.198E−02 (7,000 s) | 1.216E−01 (7,000 s) | | 2.499E−02 | 4.901E−02 |

The ingot was demonstrated to be uniform via ICP-MS and had quantified activity, and thus could be used as a reference material upon analysis using the NaI detector.

The ingot was measured in and out of the shielding box, and the nuclide measured to analyze the concentration of uranium is U-235. Because the sample ingot is artificially contaminated with uranium powder having an enrichment of 4.65 w/o and then subjected to melting decontamination, the uranium enrichment in the ingot is estimated to be 4.65 w/o. However, metal generated in the subsequent heavy water reactor process may also be made into an ingot using melting decontamination, and thus the MDA was calculated on the assumption that the uranium enrichment in the additional ingot is 0.711 w/o. MDA was determined using the KTA-Rule for German regulatory compliance, which is comparatively simple and uses a fixed width based on a full width at half maximum (FWHM) in the peak region, in a fashion similar to the other MDA calculation.

The MDA calculation based on the KTA-Rule is represented by Equation 3 below.

$$MDA = \frac{(\sqrt{avgBKG \times FWHM}) \times \sigma(\text{confidence level})}{\text{Live Time} \times \text{efficiency} \times \gamma - \text{ratio}} \quad \text{[Equation 3]}$$

Ultimately, the radioactivity was not detected in all measurements, but the MDA exceeded the radioactivity reference (0.0187 Bq/g) of the ingot. To acquire the MDA of the corresponding level, measurement has to be performed for about thirty thousand seconds or more in the shielding box, which is regarded as being in actuality impossible. Although quantitative analysis of radioactivity using NaI in a very low amount of 0.01 Bq/g is considered difficult, the MDA value corresponding to 1/10 of 0.495 Bq/g which is the disposal limit for metal waste may be ensured upon measurement for about 3,600 sec in the shielding box. In the case of metal As is apparent from Table 3, the MDA was calculated depending on the measurement time and the extent of shielding of background radiation. Because the radioactivity of the ingot used in the test is very low and the density of the medium is comparatively high, when gamma rays generated from the inside of the medium move up to the surface of the detector in consideration of attenuation by the medium, without effects due to statistical change, a question may be raised in terms of the performance of the detector able to detect such radiation. To evaluate whether the performance of detection for radiation emitted from U-235 is sufficient, an ingot which has only one contaminated surface was used. The ingot having the single contaminated surface was directly manufactured from a melt during the melting decontamination, and artificially manufactured in a state of containing a contaminant (slag). Thus the contaminant is expected to be mainly distributed at the upper end of the ingot due to the difference in density between the slag and the melt. As a result of measurement using a surface contamination meter, the contaminated surface exhibits comparatively high contamination, whereas the surface opposite the contaminated surface shows the background level.

The thickness of the ingot is 2 cm and is comparatively thinner than an ingot produced in melting decontamination facilities, but is sufficient for testing. The probability in which gamma rays of 185.72 keV emitted from U-235 distributed on one surface of the ingot pass through the ingot having a thickness of 2 cm and reach the opposite surface is 8.68%, and the corresponding value was calculated using a theoretical equation:

$$I = I_0 \exp^{-\mu t}.$$

TABLE 4

Measurement of Surface Contamination of Contaminated Ingot (identiFINDER)

| | Measured Value (CPS) - (180~190 keV range) | | |
|---|---|---|---|
| | Contaminated surface | Non-contaminated surface | Note |
| Contaminated Ingot | 2.922 | 0.674 | 23% |

The count number on the non-contaminated surface is 23% of that on the contaminated surface, which is greater than the theoretical value of 8.7%. This is because uniform formation of the contaminated surface of the ingot is actually difficult and the area of interest relative to the contaminated surface of the ingot is enlarged, which is vertically spaced apart from the contaminated surface by 2 cm. The theoretical calculation is based on the assumption that only the surface of the ingot is contaminated, but upon actually manufacturing the contaminated ingot, the uranium contaminant may permeate to a predetermined depth from the surface of the ingot, undesirably deteriorating self-absorption effects by the medium.

However, in the case of the ingot having a thickness of about 2 cm, uranium gamma rays (U-235; 185.72 keV) emitted from the contaminated surface are detected on the opposite surface, from which the radioactivity of the ingot may be sufficiently analyzed using the corresponding detector. The corresponding detector has a NaI crystal area (about 17.5 cm$^2$) much smaller than the effective measurement area (166 cm$^2$) of the surface contamination meter, and thus may measure only a portion of the surface of the ingot, but does not have a great influence on analysis because the ingot is typically uniform, and is therefore regarded as effective at analyzing the radioactivity of uranium in the ingot.

Figure 5:
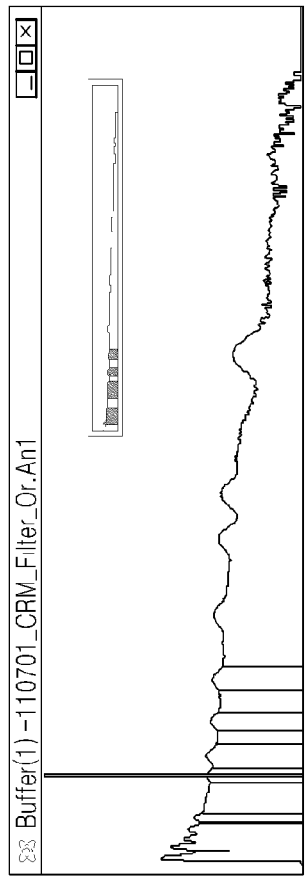
FIGS. 5A and 5B illustrate energy and efficiency calibrations of the NaI gamma scintillator in the process of measuring the radioactive material according to the present invention.
Figure 5:
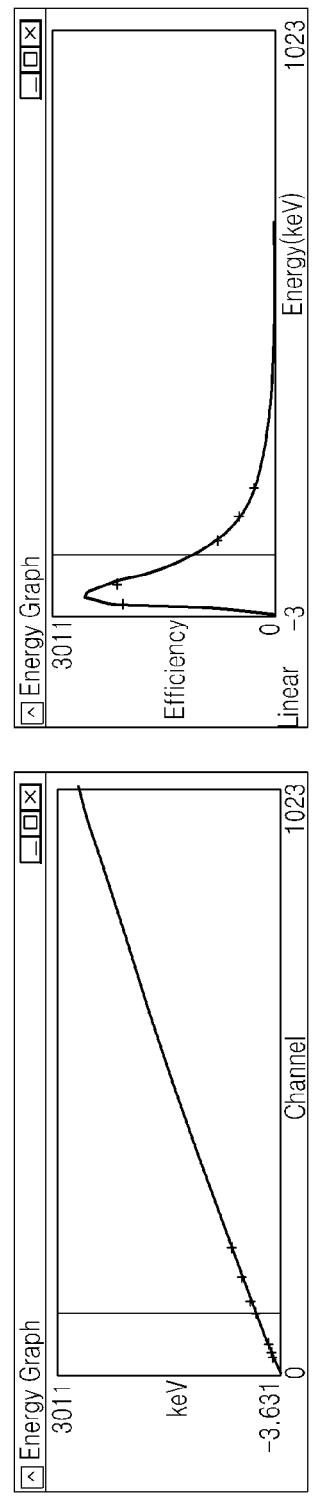

FIGS. 5A and 5B show the energy and efficiency calibrations of the detector using the reference material, in which FIG. 12A shows the spectrum of the certificated reference material and FIG. 12B shows the energy calibration and the efficiency calibration at the left and the right, respectively.

When radiation in the ingot is actually measured using a radioactivity detector, radiation reaching the detector is gamma rays generated by most of the ingot as shown in FIG. 5A.

However because the ingot is made of a metal medium having high density, it is difficult to accurately determine the moving distance from the generation position of gamma rays up to the effective area of the detector, making it very difficult to determine the amount (volume/mass) of the ingot which affects the detection.

Figure 6:
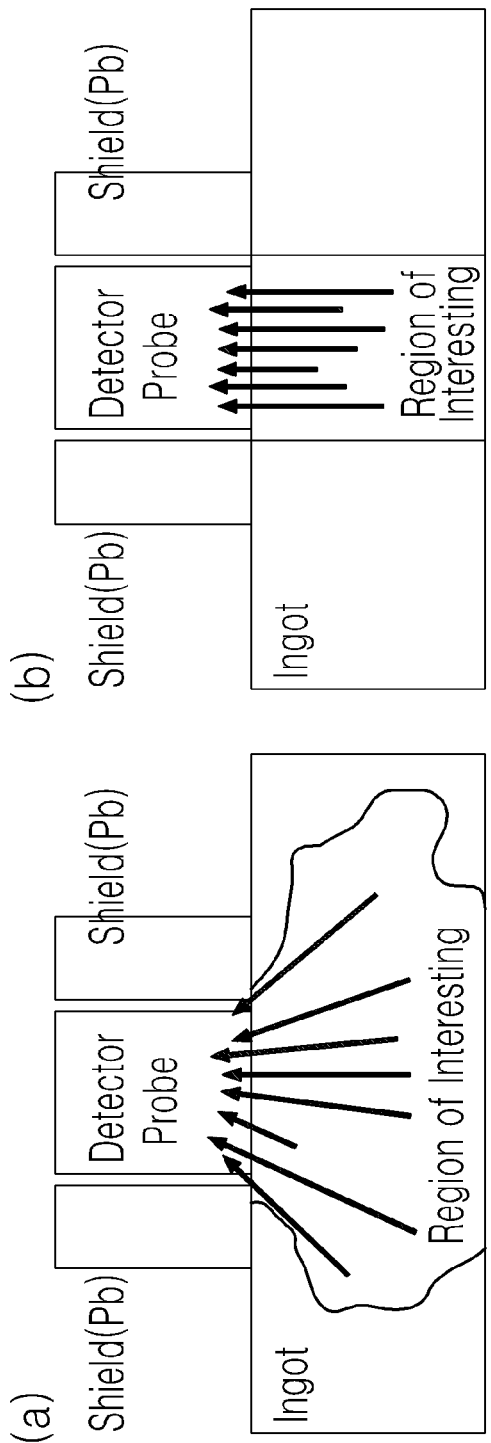
FIGS. 6A and 6B illustrate the actual radioactivity detection environment and the detection environment upon calculating radioactivity of the invention, respectively, in the process of measuring the radioactive material according to the present invention.

In the present invention the detection region of the ingot is supposed to be FIG. 6B. In this case, as shown in FIG. 6A, because radiation coming from most of the ingot is supposed to be generated in the region corresponding to the detection area of the detector, the radiation generation density in the ingot relative to the region of interest is increased compared to the actual case. On the assumption that the radiation incident on the detector has the same flux in both of FIGS. 6A and 6B, the volume of the region of interest of the ingot of FIG. 6B is smaller compared to FIG. 6A, and thus detection environment like that of FIG. 6B is evaluated conservatively in terms of the analysis of radioactivity of the ingot. This assumption may be applied under conditions of the radioactivity of the ingot being uniform. The assumption in which the radioactivity of the ingot produced using melting decontamination is uniform is sufficiently reasonable within the scope of the present invention.

Melt and Ingot Homogeneity

Regarding the melt and ingot Homogeneity in the present invention, Homogeneity of the ingot produced using melting decontamination has already been revealed by many prior studies. For example, according to M. Aoyama (2005), upon a melting decontamination test of stainless steel contaminated with depleted uranium, the upper, middle and lower portions of the melt were sampled and analyzed using ICP-MS, so that respective concentrations were reported to be similar.

Furthermore in many industrial melting decontamination facilities, activity analysis was performed on the assumption that all the ingots produced using melting decontamination are uniform. Particularly in the case of Studsvik, only a small amount was sampled from an ingot having 3~5 tons and analyzed. The melting decontamination is advantageous because representativeness of the ingot in a large scale may be acquired by analyzing a small amount of sample.

However, there may exist local radioactivity concentrations depending on operating conditions such as the type of melting furnace and the additive upon melting decontamination. Thus in the present example, the following melting decontamination tests were conducted two times, and the melt and the ingot/slag were analyzed using ICP-MS, thereby ascertaining the homogeneity of the melt.

Two tests were carried out. The first test was performed by subjecting contaminated metal waste to melting decontamination, thus producing 10 ingots among which a single melt sample and two ingot samples were selected, and the upper, middle and lower portions at three different positions of each of the selected ingots, namely, 9 positions per ingot, were sampled and analyzed and compared using ICP-MS, and simultaneously the melt sample and slag were subjected to gamma nuclide analysis using HPGe, thereby conducting cross analysis. In particular in the case of slag, the slag was sampled in the early, middle and late stages of melting decontamination depending on the time at which slag was generated, and respectively analyzed.

The second test was carried out by artificially charging 1 kg of UO$_2$ having an enrichment of 4.65 w/o to non-contaminated metal to evaluate the material balance depending on the melting decontamination, and by sampling a single sample from the melt as in the first test to perform cross analysis using ICP-MS and gamma nuclide analysis, and also by sampling two of produced ingots at 9 positions per ingot to perform uranium concentration analysis using ICP-MS, thus proving homogeneity in the melt. The generated slag was subjected to both gamma analysis and ICP-MS analysis, thus determining a decontamination coefficient and calculating the material balance.

In the melting decontamination process, 1 kg of UO$_2$ powder was charged into a melting furnace and nuclear fuel power having a comparatively high enrichment of 4.65 w/o was used. The melting decontamination in the melting furnace was carried out for about 3 hr. Because the ingot was separated from the mold in a state of the ingot being sufficiently cooled, this separating was performed the day after melting decontamination.

Figure 7:
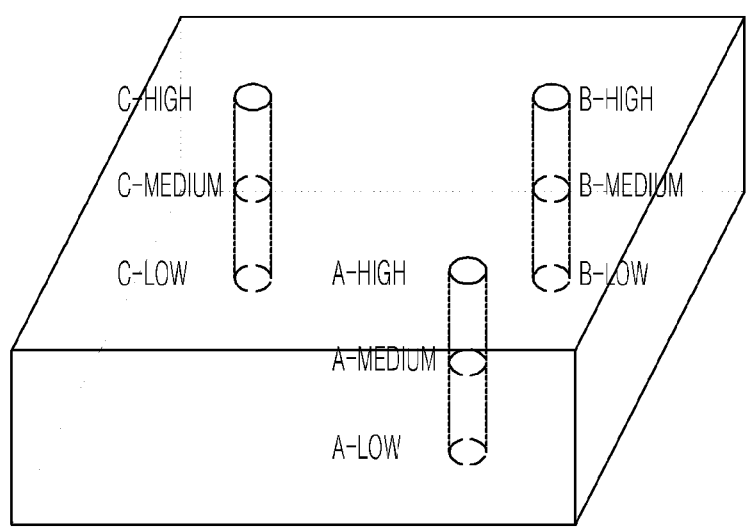
FIG. 7 illustrates the sampling positions inside the ingot subjected to melting decontamination in the process of measuring the radioactive material according to the present invention.

Sampling was conducted in ingots and slag produced upon first and second tests, according to ASTM-1806. The samples and the measurement method are given in Tables 5 and 6 below, and FIG. 7 shows the sampling positions of the ingot.

TABLE 5

Sampling upon First Melting Decontamination Test

| Type | Sampling Method | Gamma Nuclide Analysis | ICP-MS Analysis | Note |
|---|---|---|---|---|
| #3 Ingot (25.6 kg) | milling | 1,000 mL sampling | 1 EA sampling | |
| #6 Ingot (39.0 kg) | drilling | | 3 × 3 EA sampling | |
| #7 Ingot (25.4 kg) | drilling | | 3 × 3 EA sampling | |
| Slag (—) | — | | 3 EA sampling | |
| Total | | about 1000 mL | 22 EA | |

TABLE 6

Sampling upon Second Melting Decontamination Test

| Type | Sampling Method | Gamma Nuclide Analysis | ICP-MS Analysis | Note |
|---|---|---|---|---|
| #3 Ingot (23.6 kg) | milling | 1,000 mL sampling | 1 EA sampling | |
| #6 Ingot (36.6 kg) | drilling | | 3 × 3 EA sampling | |
| #7 Ingot (22.4 kg) | drilling | | 3 × 3 EA sampling | |
| Melt Sample (6.4 kg) | milling | 1,000 mL sampling | 1 EA sampling | Crucible |
| Slag (—) | — | | 3 EA sampling | |
| Total | | about 2000 mL | 23 EA | |

Analytic Results

The ingots and slag produced upon first and second melting decontamination tests were analyzed using ICP-MS and HPGe, thus obtaining the following results.

TABLE 7

Analysis of Ingots and Slag using Melting Decontamination Tests

| | | ICP-MS (Bq/g) | HPGe (Bq/g) | Note |
|---|---|---|---|---|
| 1st | #3 Ingot | 0.0047 | 0.0120 | |
| | #6 Ingot | 0.0047~0.0096 (Avg: 0.0071, STD: 0.00143) | — | |
| | #7 Ingot | 0.0049~0.0078 (Avg: 0.0059, STD: 0.000952) | — | |
| | Slag | 337/13.2/9.02 | 131/14.9/28.7 | Early/Middle/Late |
| | Melt | 0.0250 | 0.02045 | |
| 2nd | #3 Ingot | 0.0212 | 0.02813 | |
| | #6 Ingot | 0.0145~0.0209 (Avg: 0.0170, STD: 0.00206) | — | |
| | #7 Ingot | 0.0148~0.0276 (Avg: 0.0187, STD: 0.00372) | — | |
| | Slag | 4,941/86.4/491.8 | 2,903/286.8/932.2 | Early/Middle/Late |

In the first melting test, uranium was not artificially charged, and thus the radioactivity of ingots and slag was low, and also because contaminated metal waste which is difficult to measure was subjected to melting decontamination, the initial contamination concentration could not be determined.

In the second melting test, the initial contamination concentration was $7.3 \times 10^7$ Bq.

The radioactivity in the ingots using ICP-MS was measured to be 0.0047~0.0096 Bq/g in the first test and 0.0145~0.0250 Bq/g in the second test. Although there seems to be a relatively small standard deviation, the corresponding level is vey low to the extent of less than 1/10 of the natural level (0.0250 Bq/g is about 0.3 ppm, and the uranium concentration in the natural soil is about 3~5 ppm). Taking into consideration the statistical measurement error occurring therefrom, the above results are evaluated as being good enough to prove homogeneity in the melt upon melting decontamination.

The ingot having the highest measurement value is less than 2% of the clearance limit of 0.497 Bq/g, from which the decontamination level is evaluated to be excellent using melting.

Tables 8 to 13 below show the measurement results per ingot sample.

TABLE 8

Analytic Results of #3 Ingot upon First Melting Decontamination Test (ICP-MS/HPGe)

| | | Activity (Bq/g) | | | |
|---|---|---|---|---|---|
| | Analytic Method | U-235 | U-238 | Total | Note |
| #3 Ingot | ICP-MS | 0.0002 | 0.0010 | $4.70 \times 10^{-3}$ | |
| | HPGe | $4.95 \times 10^{-4}$ | — | $1.20 \times 10^{-2}$ | |

TABLE 9

Analytic Results of #6 Ingot upon First Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0003 | 0.0019 | 0.0073 | |
| 2 | A-Middle | 0.0003 | 0.0018 | 0.0068 | |
| 3 | A-Lower | 0.0002 | 0.0015 | 0.0062 | |
| 4 | B-Upper | 0.0002 | 0.0015 | 0.0079 | |
| 5 | B-Middle | 0.0004 | 0.0022 | 0.0096 | |
| 6 | B-Lower | 0.0003 | 0.0019 | 0.0079 | |
| 7 | C-Upper | 0.0002 | 0.0012 | 0.0047 | |
| 8 | C-Middle | 0.0003 | 0.0018 | 0.0077 | |
| 9 | C-Lower | 0.0002 | 0.0014 | 0.0058 | |
| | Average | — | — | 0.0071 | |
| | Standard Deviation | — | — | 0.00143 | |

TABLE 10

Analytic Results of #7 Ingot upon First Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0002 | 0.0013 | 0.0054 | |
| 2 | A-Middle | 0.0002 | 0.0015 | 0.0061 | |
| 3 | A-Lower | 0.0003 | 0.0019 | 0.0069 | |
| 4 | B-Upper | 0.0002 | 0.0012 | 0.0049 | |
| 5 | B-Middle | 0.0002 | 0.0017 | 0.0056 | |
| 6 | B-Lower | 0.0002 | 0.0013 | 0.0050 | |
| 7 | C-Upper | 0.0002 | 0.0014 | 0.0062 | |
| 8 | C-Middle | 0.0003 | 0.0026 | 0.0078 | |
| 9 | C-Lower | 0.0002 | 0.0013 | 0.0053 | |
| | Average | — | — | 0.005911 | |
| | Standard Deviation | — | — | 0.000952 | |

TABLE 11

Analytic Results of Melt and #3 Ingot upon Second Melting Decontamination Test (ICP-MS/HPGe)

| | | Activity (Bq/g) | | |
|---|---|---|---|---|
| Analytic Method | U-235 | U-238 | Total | Note |
| #3 Ingot ICP-MS | 0.0007 | 0.0031 | $2.12 \times 10^{-2}$ | |
| HPGe | $1.26 \times 10^{-3}$ | — | $2.813 \times 10^{-2}$ | 4.65 w/o |
| Melt Sample ICP-MS | 0.0011 | 0.0036 | $2.50 \times 10^{-2}$ | |
| HPGe | $9.18 \times 10^{-4}$ | — | $2.045 \times 10^{-2}$ | 4.65 w/o |

TABLE 12

Analytic Results of #6 Ingot upon Second Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0008 | 0.0025 | 0.0175 | |
| 2 | A-Middle | 0.0008 | 0.0026 | 0.0185 | |
| 3 | A-Lower | 0.0009 | 0.0026 | 0.0185 | |
| 4 | B-Upper | 0.0008 | 0.0022 | 0.0153 | |
| 5 | B-Middle | 0.0008 | 0.0023 | 0.0162 | |
| 6 | B-Lower | 0.0008 | 0.0024 | 0.0167 | |
| 7 | C-Upper | 0.0008 | 0.0030 | 0.0209 | |
| 8 | C-Middle | 0.0007 | 0.0021 | 0.0145 | |
| 9 | C-Lower | 0.0008 | 0.0021 | 0.0150 | |
| | Average | — | — | 0.017011 | |
| | Standard Deviation | — | — | 0.002056 | |

TABLE 13

Analytic Results of #7 Ingot upon Second Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0010 | 0.0026 | 0.0183 | |
| 2 | A-Middle | 0.0009 | 0.0024 | 0.0170 | |
| 3 | A-Lower | 0.0010 | 0.0024 | 0.0171 | |
| 4 | B-Upper | 0.0007 | 0.0027 | 0.0187 | |
| 5 | B-Middle | 0.0007 | 0.0030 | 0.0209 | |
| 6 | B-Lower | 0.0008 | 0.0040 | 0.0276 | |
| 7 | C-Upper | 0.0006 | 0.0025 | 0.0176 | |
| 8 | C-Middle | 0.0005 | 0.0021 | 0.0148 | |
| 9 | C-Lower | 0.0007 | 0.0027 | 0.0166 | |
| | Average | — | — | 0.018733 | |
| | Standard Deviation | — | — | 0.003716 | |

Analytic Results of Ingots (Portable NaI Detector)

Although the above HPGe and ICP-MS analysis methods have very high precision and accuracy, analysis costs are high and a very long time and a lot of effort are required to pretreat the measurement sample, and also the measurement time is not short, making it difficult to instantly feedback the analytic results to the location where the decontamination is being carried out.

In order to increase decontamination work efficiency and instantly determine the analyzed ingot radioactivity, a surface contamination meter such as FHT-100 able to measure the radioactivity on site may be used, but the measurement of the radioactivity of ingots having volume contamination characteristics using the above meter is difficult.

Thus to analyze the radioactivity of the ingots subjected to decontamination in the present invention, a NaI spectrometer having gamma measurement efficiency higher than the surface contamination meter is used. Also to acquire reliable measurement, ingots analyzed using NaI are milled thus manufacturing a Marinelli beaker type sample which is then analyzed using HPGe, thus performing cross analysis.

The samples used in cross analysis are about 20 ingots including No. 0114-3 ingot, and the corresponding ingots are obtained by subjecting metal waste generated during the light water reactor fuel processing to melting decontamination, in which some of them were manufactured for clearance (Table 14), and others having high radioactivity were intentionally manufactured to perform a series of tests about the radioactivity analysis (Table 15). The uranium enrichment in the corresponding ingots was 4.0 w/o. When metal waste is generated in radiation controlled zones, it is thoroughly sorted depending on the affected areas, methods of production, contamination characteristics, etc. The metal waste sorted as above is stored in respective drums depending on contamination characteristics, physical properties, etc., and thus a history survey of respective ingots produced using melting decontamination is possible, from which desired results were deduced.

The results of analyzing the radioactivity in ingots using HPGe and NaI are shown in Tables 14 and 15 below.

TABLE 14

Gamma Nuclide Analysis - Cross Analysis (HPGe & NaI) - Clearance Targets

| | | | HPGe (10000 s) | | NaI (3600 s) | | | |
|---|---|---|---|---|---|---|---|---|
| No. | Sample No. | Sample Amount (g) | Measure Result (Bq/g) | MDA (Bq/g) | Measure Result (Bq/g) | MDA (Bq/g) | Deviation (%)* | Note |
| 1 | 0114-3 | 279.7 | 2.195E−02 | 9.162E−03 | ≤MDA | 3.822E−02 | 43% | |
| 2 | 0217-3 | 396.9 | 2.531E−02 | 6.395E−03 | ≤MDA | 3.950E−02 | 36% | |
| 3 | 0218-3 | 487.3 | 3.680E−02 | 7.665E−03 | ≤MDA | 3.574E−02 | −3% | |
| 4 | 0224-3 | 378.2 | 6.469E−02 | 1.505E−02 | ≤MDA | 3.487E−02 | −86% | |
| 5 | 0225-3 | 525.2 | 4.564E−02 | 5.004E−03 | ≤MDA | 3.714E−02 | −23% | |
| 6 | 0318-3 | 347.2 | ≤MDA | 1.013E−02 | ≤MDA | 3.576E−02 | 72% | |

TABLE 14-continued

Gamma Nuclide Analysis - Cross Analysis (HPGe & NaI) - Clearance Targets

| No. | Sample No. | Sample Amount (g) | HPGe (10000 s) Measure Result (Bq/g) | MDA (Bq/g) | NaI (3600 s) Measure Result (Bq/g) | MDA (Bq/g) | Deviation (%)* | Note |
|---|---|---|---|---|---|---|---|---|
| 7 | 0323-3 | 482.3 | 5.206E−02 | 1.041E−02 | ≤MDA | 3.572E−02 | −46% | |
| 8 | 0325-3 | 505.4 | 2.618E−02 | 7.032E−03 | ≤MDA | 3.569E−02 | 27% | |
| 9 | 0406-3 | 441.8 | 6.800E−02 | 5.940E−03 | ≤MDA | 3.611E−02 | −88% | |
| 10 | 0421-3 | 357.7 | 3.620E−02 | 7.788E−03 | ≤MDA | 3.512E−02 | −3% | |
| 11 | 0506-3 | 401.7 | 2.278E−02 | 6.814E−03 | ≤MDA | 3.661E−02 | 38% | |
| 12 | 0524-3 | 651.7 | 2.041E−02 | 4.459E−03 | ≤MDA | 3.390E−02 | 40% | |
| 13 | 0525-3 | 395.8 | 5.844E−02 | 6.368E−03 | ≤MDA | 3.628E−02 | −61% | |
| 14 | 0623-3 | 465.0 | 5.572E−02 | 1.002E−02 | ≤MDA | 3.566E−02 | −56% | |
| 15 | 0701-3 | 500.2 | 5.334E−02 | 5.500E−03 | ≤MDA | 3.602E−02 | −48% | |
| 16 | 0705-3 | 512.0 | 5.853E−02 | 5.512E−03 | ≤MDA | 3.589E−02 | −63% | |
| 17 | 0712-3 | 656.5 | 3.906E−02 | 4.621E−03 | 9.006E−02 | 3.561E−02 | 57% | |
| 18 | 0718-3 | 360.6 | 3.402E−02 | 7.504E−03 | ≤MDA | 3.595E−02 | 5% | |

*Deviation = (NaI measurement result − HPGe measurement result)/(NaI measurement result) × 100%

TABLE 15

Gamma Nuclide Analysis - Cross Analysis (HPGe & NaI) - High Concentration Level

| No. | Sample No. | Sample Amount (g) | HPGe (10000 s) Measure Result (Bq/g) | MDA (Bq/g) | NaI (3600 s) Measure Result (Bq/g) | MDA (Bq/g) | Deviation (%)* | Note |
|---|---|---|---|---|---|---|---|---|
| 1 | 0621-3 | 581.8 | 1.863E−01 | 6.555E−03 | 1.812E−01 | 3.716E−02 | −3% | |
| 2 | 0615-3 | 456.9 | 4.557E−01 | 6.830E−03 | 5.104E−01 | 3.778E−02 | 11% | |
| 3 | 0714-3 | 454.3 | 5.880E−01 | 8.254E−03 | 7.020E−01 | 3.914E−02 | 16% | |
| 4 | 0707-5 | 606.9 | 5.367E−01 | 7.475E−03 | 7.189E−01 | 3.926E−02 | 25% | |

*Deviation = (NaI measurement result − HPGe measurement result)/(NaI measurement result) × 100%

Upon analysis using NaI, MDA was measured to be about $3.5 \times 10^{-2}$ Bq/g for 3,600 sec, which is about 2~10 times higher than the MDA by HPGe (measurement for 10,000 sec). However, because this value is less than 1/10 of 0.497 Bq/g that is the clearance limit for metal waste, this is regarded as sufficient for determining whether the ingot may be self-disposed of. Also because the sample having similar radioactivity shows comparatively uniform MDA, the reliability of the detector to operate normally is ensured.

The analytic results using NaI are mostly equal to or lower than MDA, which means that all the ingots produced using melting decontamination may be self-disposed of. When the results measured using NaI are conservatively defined as MDA and compared with the measurement results using HPGe, there may be the case where NaI is underestimated to a maximum of 88% compared to HPGe (Sample No.: 0406-3), which is considered to be due to the uncertainty due to very low radioactivity. The actual difference is about $5.76 \times 10^{-2}$ Bq/g, and is the level that ensures a sufficient margin, in consideration of the concentration of the clearance limit.

Generating the measurement deviation is understood to be limited only at a very low radioactivity level. To validate this, the ingots having slightly high radioactivity generated during the additive charging test at the early stage of melting decontamination (Table 15) were subjected to radioactivity measurement using NaI. Because the amount of the additives of the corresponding ingots was adjusted to produce ingots having relatively high radioactivity in order to perform cross analysis of HPGe and NaI for metal having high radioactivity level, the radioactivity approximates or partially exceeds the clearance limit.

As a result of measuring the radioactivity of the corresponding ingots, the analytic results of NaI and HPGe were similar at the concentration of about $1.8 \times 10^{-1}$ Bq/g. However, as the radioactivity increases, analytic results using NaI are shown to be comparatively higher.

This may be understood to be a conservative approach to the uncertainty of portions which are difficult to actually quantify and to apply to analysis methods, such as the geometry of target ingots, etc., and such effects increase in proportion to an increase in the radioactivity. To identify the quantitative analysis of radioactivity measured using NaI and the mechanism thereof, additional research is required, but to determine whether the ingots subjected to melting decontamination may be self-disposed of or not, only the NaI method is sufficiently effective.

Although all the ingots analyzed via NaI were subjected to cross analysis using a gamma spectrometer (HPGe) in order to improve the reliability of the analysis, the HPGe suffers from the additional formation of the samples therefor, long measurement time, and high analysis cost, and thus the cross analysis range may be adjusted to adapt it to an actual location within the range in which the reliability of NaI is sufficiently ensured.

The crystal size of the NaI detector is $1.4 \times 2$ inch$^2$ and the detection area is a portion of the entire ingot area thus causing problems of representativeness. In many foreign and domestic studies, however, the ingots manufactured using the same melt are reported to have uniform radioactivity, which was validated at Korea Nuclear Fuel Co., Ltd. Because uranium nuclides are uniformly distributed in the ingots as mentioned above, even when the local radioactivity of the ingots is measured, the corresponding concentration is regarded as representing the radioactivity of the total ingot, in particular the total melt. Thus, the radioactivity analyzed using NaI may represent the radioactivity of the total ingot, and is effective at determining whether the corresponding ingot is subjected to clearance.

As described above, the present invention provides a method of measuring the radioactive material of an ingot using a NaI detector. According to the present invention, an ingot having a volume resulting from melting decontamination of metal waste generated in nuclear fuel processing or production facilities undergoes gamma spectroscopy using a NaI detector to measure radioactivity of U-235 (185.72 keV, 57.2%) among uranium isotopes, thus rapidly determining the radioactivity of total uranium, whereby whether the ingot resulting from melting decontamination of metal waste is self-disposed of or not can be rapidly and efficiently determined.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for evaluating the disposability of an ingot generated from metal waste derived from a nuclear fuel processing or production facilities source comprising:
   a. subjecting the metal waste to melting decontamination;
   b. forming therefrom an ingot having a volume;
   c. ascertaining an enrichment value of U-235 based on the source of the metal waste;
   d. performing gamma spectroscopy using a NaI detector to generate a detection value for gamma rays of U-235 (185.72 keV, 57.2%) among uranium isotopes,
   e. performing detector calibration using a certified reference material (CRM),
   f. determining a self-absorption correction factor depending on density of a medium by applying a MCNP® (Monte Carlo N-Particle) computer code that simulates the probability that gamma rays from U-235 decay of the CRM and an ingot sample will reach the detector,
   g. applying the self-absorption correction factor generated at step f to the detection value for gamma rays of U-235(185.72 keV, 57.2%) at step d to yield a corrected detection value for gamma rays of U-235,
   h. determining the mass of U-235 based on specific activity applied to the corrected detection value for U-235 generated at step g,
   i. calculating total uranium mass based on the mass of U-235 and the abundance ratio among uranium radionuclides U-234, U-235 and U-238, wherein the abundance ratio depends on the enrichment value of U-235:
   j. calculating total uranium radioactivity of the ingot from total uranium mass and the following equation:

$$S.A\ (Ci/g) = (0.4 + 0.38E_{235} + 0.0034E_{235}^2) \times 10^{-6}$$

wherein S.A is the specific activity of total uranium based on the enrichment value of U-235 ($E_{235}$), and
   k. if the total uranium radioactivity is below a disposal limit, clearing the ingot for recycling or disposal.

2. The method of claim 1, wherein U-235 has an enrichment value of 0.711 w/o to 5 w/o.

3. The method of claim 1, wherein an effective live time of the ingot using the NaI detector is from 3,600 to 7,200 sec.

4. The method of claim 1, wherein the ingot has a thickness of 1 to 5 cm.

5. The method of claim 1 wherein the abundance ratio is as provided in the table below:

| Nuclide | Abundance Ratio in Natural and Enriched Uranium | | | |
| --- | --- | --- | --- | --- |
| | Natural | 2.0 w/o | 3.5 w/o | 4.5 w/o |
| U-234 | 0.00005 | 0.00016 | 0.00030 | 0.00039 |
| U-235 | 0.00711 | 0.02000 | 0.03500 | 0.04500 |
| U-238 | 0.99284 | 0.97984 | 0.96470 | 0.95461 |

* * * * *